(No Model.)
L. R. CARHART.
SCRAPER.
No. 396,647. Patented Jan. 22, 1889.
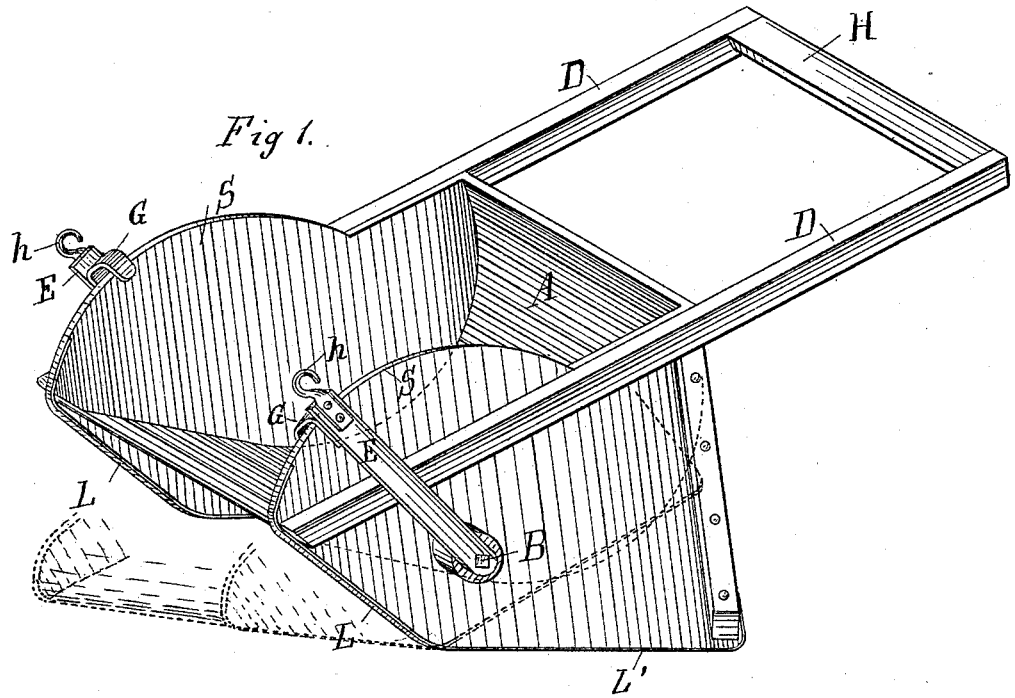
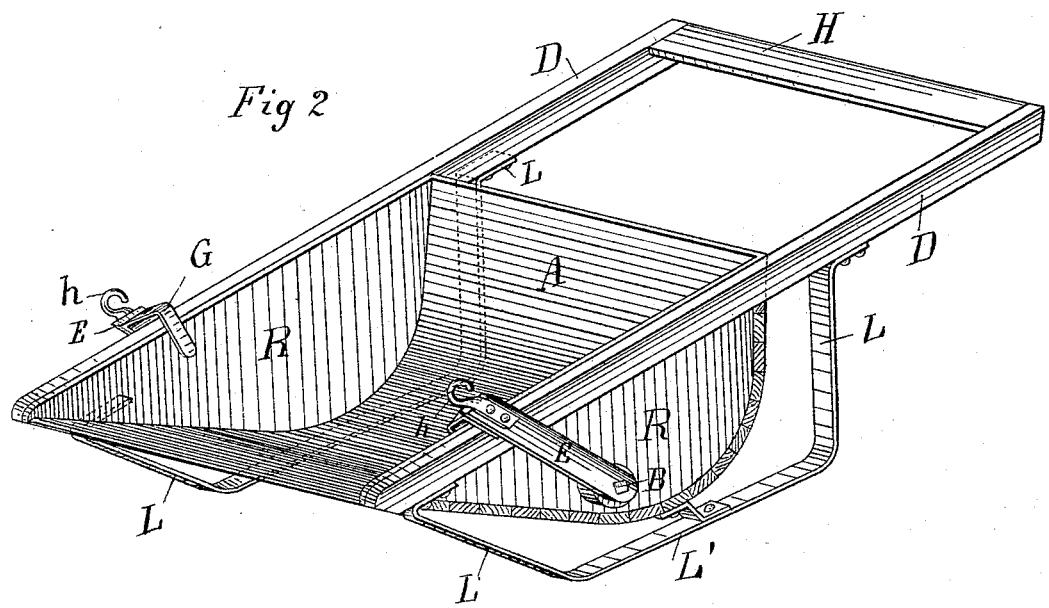
WITNESSES:
Walter E. Ward.
Seymour N. Harris.
INVENTOR,
L. Romaine Carhart.
BY
Frederick N. Cameron
ATTORNEY,

UNITED STATES PATENT OFFICE.

LEONARD ROMAINE CARHART, OF COEYMANS, NEW YORK.

SCRAPER.

SPECIFICATION forming part of Letters Patent No. 396,647, dated January 22, 1889.

Application filed June 11, 1888. Serial No. 276,689. (No model.)

*To all whom it may concern:*

Be it known that I, LEONARD ROMAINE CARHART, a citizen of the United States, residing at Coeymans, in the county of Albany and State of New York, have invented a new and useful Ice-Scraper, of which the following is a specification.

My invention relates to tools and implements for preparing ice for harvesting; and the object of my invention is to provide an ice-scraper by means of which snow may be removed from a field of ice and transported onto the shore bordering the pond, lake, or stream upon which the ice is formed. I attain this object by the mechanism illustrated in the accompanying drawings, in which—

Figure 1 is a perspective view of my ice-scraper ready for use, and Fig. 2 represents a common road-scraper provided with my improved runners.

Similar letters refer to similar parts throughout the several views.

The scoop or hopper of my scraper consists of a bottom, A, usually constructed of wood, and the sides S S, having their upper edge oval in form and extending below the bottom of the hopper, their lower edges forming the runners L L'. Where the side comes in contact with the bottom of the forward part or mouth of the hopper, it is pointed, the forward lower edge of the side being cut at an angle, forming the two runner-surfaces L and L'. By this arrangement of the runners L and L' the scraper may be tilted forward and be propelled along the ice with the mouth of the hopper close to the surface of the ice resting on the runners L L', as shown in the dotted lines in Fig. 1. When a sufficient amount of snow has been received by the hopper, the scraper can be tilted back upon the runners L L'. The sides S S are usually constructed of wood, and may be made of one or more pieces, as desired. The running edges L and L' are usually provided with suitable shoes. To the sides S S are attached the bars D D, which are connected together in the rear of the scraper by the handle-bar H. To each side piece, S, is attached, by bolt B or in any suitable manner, a hook-bar, E, provided at its end opposite the bolt B with the hook *h*, to which is attached the motive power in any suitable manner. The hook-bar E also has attached to it, near the end opposite the bolt B, the guide-hook G, which passes over the convex portion of the side piece S and tends to steady the hook-bar E. The bars D D, to which the handle-bar H is attached, may be secured to the side pieces, S S, as shown in the drawings, or to the end of the scraper, or in any other suitable manner. When the bars D D are attached to the side pieces, it is necessary to have the hook-bars raised from the side pieces, which is done by placing washers on the bolts B in order to allow the free movement of the hook-bars E, since it is necessary that the hook-bars E should be movable about the bolts B in order to accommodate itself to the change of position taken by the scraper in the various phases assumed by it in the performance of its work in taking in snow, carrying it as a sleigh, and dumping it.

To use the scraper on a pond covered with snow, a horse is attached to it by means of the hooks *h h* and the scraper is tilted forward in the position shown by the dotted lines in Fig. 1. The hopper, when full of snow, is then forced back onto the runners L' L' by pressing down on the handle H, the position then being that shown by the full lines in Fig. 1. When the scraper is in the last-mentioned position, it is virtually a sleigh carrying a load of snow, and can be drawn onto the shore of the pond and there dumped of the snow contained in it by tilting it over forward in the manner usually employed in dumping a scraper.

The great advantage gained by the use of my scraper is that it can be made to carry the snow over a rough surface onto the shore without tipping over, as the ordinary scraper will do which slides along in the position shown by the dotted lines in Fig. 1. The first inequality met with causes it to turn over forward, and it is therefore impossible to carry the snow on the shore by means of the ordinary scraper.

It is often desirable to clean the entire surface of a small pond from snow in order that all the ice contained in the pond may be harvested. In order to do so my scraper proves very valuable. In fact, there is no other scraper with which I am familiar that can perform the work accomplished by my scraper.

An ordinary scraper may be provided with runners made in the form of the runners L L', as shown in Fig. 2 of the drawings.

What I claim as my invention, and desire to secure by Letters Patent, is—

1. In an ice-scraper, the combination of the runners L L', formed at an angle to each other, with the bars D D, attached to the side pieces, with the hook-bars E, movable about bolts B and provided with hooks $h$, all substantially as described, and for the purpose set forth.

2. In an ice-scraper, the combination of the runners L L', formed at an angle to each other, with the bars D D, attached to the side pieces, with the hook-bars E, movable about bolts B and provided with hooks $h$, and the guide-hooks G, all substantially as described, and for the purpose set forth.

3. In an ice-scraper, the combination of the runners L L', formed at an angle to each other, with the side pieces, S S, having their upper edges convex in form, with the bars D D, attached to the side pieces, S S, with the hook-bars E, movable about bolts B and provided with the hooks $h$, and the guide-hooks G, all substantially as described, and for the purpose set forth.

LEONARD ROMAINE CARHART.

Witnesses:
FREDERICK W. CAMERON
WALTER E. WARD.